US012526116B2

(12) United States Patent
Tamura et al.

(10) Patent No.: US 12,526,116 B2
(45) Date of Patent: Jan. 13, 2026

(54) METHOD FOR SOURCE CORE NETWORK NODE, SOURCE CORE NETWORK NODE, AND NON-TRANSITORY COMPUTER-READABLE MEDIUM

(71) Applicant: NEC Corporation, Tokyo (JP)

(72) Inventors: Toshiyuki Tamura, Tokyo (JP); Takehito Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 485 days.

(21) Appl. No.: 18/012,464

(22) PCT Filed: Jan. 24, 2022

(86) PCT No.: PCT/JP2022/002313
§ 371 (c)(1),
(2) Date: Dec. 22, 2022

(87) PCT Pub. No.: WO2022/176509
PCT Pub. Date: Aug. 25, 2022

(65) Prior Publication Data

US 2023/0328834 A1 Oct. 12, 2023

(30) Foreign Application Priority Data

Feb. 16, 2021 (JP) ................................ 2021-022489

(51) Int. Cl.
*H04L 5/00* (2006.01)
*H04W 36/14* (2009.01)
*H04W 76/25* (2018.01)

(52) U.S. Cl.
CPC ......... *H04L 5/0055* (2013.01); *H04W 36/144* (2023.05); *H04W 76/25* (2018.02)

(58) Field of Classification Search
CPC ........................... H04L 5/0055; H04W 36/144
See application file for complete search history.

(56) References Cited

U.S. PATENT DOCUMENTS

2019/0313477 A1 10/2019 Kim et al.
2020/0120570 A1 4/2020 Youn et al.
2020/0337093 A1* 10/2020 Kim ..................... H04W 64/00

OTHER PUBLICATIONS

Extended European Search Report for EP Application No. 22755833.5, dated on Nov. 27, 2023.

(Continued)

*Primary Examiner* — Justin Y Lee
(74) *Attorney, Agent, or Firm* — Sughrue Mion, PLLC

(57) ABSTRACT

An object is to appropriately manage a resource for user data control. A method for a source core network node according to one aspect of the present disclosure, includes: receiving, from a source RAN associated with a 5GS, a first message for canceling handover of a terminal from the 5GS to an EPS; transmitting a second message to a target core network node associated with the EPS when receiving the first message; receiving a third message from the target core network node when transmitting the second message; transmitting a fourth message to the source RAN when receiving the third message; and transmitting a fifth message for releasing a resource being secured in a core network device when transmitting the fourth message.

17 Claims, 19 Drawing Sheets

(56) References Cited

OTHER PUBLICATIONS

NEC, “Add steps for releasing resources for indirect forwarding in Handover Cancel”, 3GPP Draft, S2-2100082, vol. SA WG2, Feb. 24 - Mar. 9, 2021, pp. 1-pp. 4.
Huawei et al., “Missing Handover cancel procedure”, 3GPP Draft, S2-2000627, vol. SA WG2, Jan. 13 - 17, 2020, pp. 1-pp. 4.
International Search Report for PCT Application No. PCT/JP2022/002313, mailed on Apr. 19, 2022.
3GPP TS 23.501 V16.7.0 (Dec. 2020),3rd Generation Partnership Project; “Technical Specification Group Services and System Aspects”; System architecture for the 5G System (5GS); Stage 2 (Release 16).
3GPP TS 23.502 V16.7.1 (Jan. 2021), 3rd Generation Partnership Project; “Technical Specification Group Services and System Aspects”; Procedures for the 5G System (5GS); Stage 2 (Release 16).

* cited by examiner

Data Network
70
SMF + PGW-C
40
UPF + PGW-U
30
SGW-C
60
SGW-U
50
MME
20
E-UTRAN
7
UE
3
AMF
10
NG-RAN
5
UE
3
N6
N11
N4
S5-C
S5-U
N26
N3
N2
S11
S1-U
S1-MME
Handover HPLMN
VPLMN
Data Network
70
SMF + PGW-C
40
UPF + PGW-U
30
SGW-C
60
SGW-U
50
MME
20
E-UTRAN
7
UE
3
V-SMF
80
V-UPF
90
AMF
10
NG-RAN
5
UE
3
N6
N16
N4
N11
N3
N2
N26
S8-C
S8-U
S11
S1-U
S1-MME
Handover

METHOD FOR SOURCE CORE NETWORK NODE, SOURCE CORE NETWORK NODE, AND NON-TRANSITORY COMPUTER-READABLE MEDIUM

This application is a National Stage Entry of PCT/JP2022/002313 filed on Jan. 24, 2022, which claims priority from Japanese Patent Application 2021-022489 filed on Feb. 16, 2021, the contents of all of which are incorporated herein by reference, in their entirety.

TECHNICAL FIELD

The present disclosure relates to a method for a source core network node and the source core network node.

BACKGROUND ART

In a telecommunications field, an effort of achieving a new generation network called a fifth-generation (5G) network has been made. In order to develop the 5G network that provides a service for various terminals, activities have been started in a plurality of research and standardization organizations.

Particularly, a third-generation partnership project (3GPP) has been examining a next-generation communication technique and a system architecture for the 5G network being a next-generation mobile communication system. Particularly, in the 3GPP, a 5G system (5GS) has been specified as a system for achieving the 5G mobile communication system. Specifications of the 5GS are disclosed in, for example, Non Patent Literature 1 and Non Patent Literature 2.

As one of main characteristics of the 5GS, a concept of "flow" is adopted as a method for transmitting user data in the 5GS. In user data transmission by a bearer adopted in an evolved packet system (EPS), a transmission node and a reception node each manage a tunnel for the user data transmission, and control quality of service (QoS), however, in flow control, a QoS flow identifier (QFI) is set for a header of packet data that transmits user data, and control of the QoS is performed in a flow unit.

CITATION LIST

Non Patent Literature

[Non Patent Literature 1] 3GPP TS 23.501 V16.7.0 (2020-12)

[Non Patent Literature 2] 3GPP TS 23.502 V16.7.1 (2021-01)

SUMMARY OF INVENTION

Technical Problem

Service succession with an EPS is stipulated in the 5GS. This is a technique for successively providing a service even when user equipment (UE) moves from a 4G to a 5G or from the 5G to the 4G since it is assumed that the 5G is introduced from an urban area in a spot manner in contrast to the 4G that covers a wide area. This technique is provided by an interworking procedure.

The interworking procedure includes 5GS to EPS handover, EPS to 5GS handover, and the like.

While user data transmission is managed by using a bearer in the EPS, the user data transmission is managed by using a flow in the 5GS. Depending on a difference in this management method, there is a difference in header information of a GPRS tunneling protocol for user plane (GTP-U) being a protocol for performing user data transmission. For example, a QFI is set for a GTP-U header being used in the 5GS, but the QFI is not set in the EPS.

When handover is operated in the 5GS and the EPS, user data need to be controlled in careful consideration of a difference in the GTP-U header being used in the 5GS and the EPS. The procedure is disclosed in Non Patent Literature 2, but an operation and a procedure of each node are ambiguous. Thus, there is a problem that a resource for user data control cannot be appropriately managed when handover is canceled, for example.

The present disclosure provides a method of appropriately managing a resource for user data control.

Solution to Problem

A method for a source core network node according to one aspect of the present disclosure includes: receiving, from a source radio access network (RAN) associated with a 5G system (5GS), a first message for canceling handover of a terminal from the 5GS to an evolved packet system (EPS); transmitting a second message to a target core network node associated with the EPS when receiving the first message; receiving a third message from the target core network node when transmitting the second message; transmitting a fourth message to the source RAN when receiving the third message; and transmitting a fifth message for releasing a resource being secured in a core network device when transmitting the fourth message.

A source core network node according to one aspect of the present disclosure includes: a reception means for receiving, from a source radio access network (RAN) associated with a 5G system (5GS), a first message for canceling handover of a terminal from the 5GS to an evolved packet system (EPS); and a transmission means for transmitting a second message to a target core network node associated with the EPS when receiving the first message, wherein the reception means receives a third message from the target core network node when transmitting the second message, the transmission means transmits a fourth message to the source RAN when receiving the third message, and the transmission means transmits a fifth message for releasing a resource being secured in a core network device when transmitting the fourth message.

Advantageous Effects of Invention

The present disclosure is able to provide a method of appropriately managing a resource for user data control.

EXAMPLE EMBODIMENT

In a procedure of UE performing Handover from a new radio (NR) being a wireless access technique of a 5G to long term evolution (LTE) or LTE-Advanced being a wireless access technique of a 4G, an operation in which the UE returns to the 5G (NR) in the middle of the Handover processing is stipulated as a Handover Cancel procedure in Non Patent Literature 2. Note that a procedure of performing Handover from the NR to LTE or LTE-Advanced may be referred to as a Handover procedure from a 5GS to an EPS. Further, a procedure of performing Handover from the NR to LTE or LTE-Advanced may be referred to as Handover of a terminal from the 5GS to the EPS.

However, in the Handover Cancel procedure in Non Patent Literature 2, an operation and a procedure of each node are ambiguous. There is a problem that a resource for user data control cannot be appropriately managed when Handover is canceled (that is, when the Handover Cancel procedure is performed), for example. Specifically, as described above, when Handover is operated in the 5GS and the EPS, user data need to be controlled in careful consideration of a difference in a GTP-U header being used in the 5GS and the EPS. For the user data control, a resource for the user data control is secured in a UPF+PGW-U 30 and an SMF+PGW-C 40. Examples of the resource include a physical resource that recognizes a difference in the GTP-U header described above, and a physical resource that appropriately controls and transfers user data, based on a difference in the GTP-U header.

Herein, for example, when the Handover Cancel procedure for the Handover procedure from the 5GS to the EPS is performed, the resource for the user data control described above needs to be released, but the release of the resource is not mentioned at all in the Handover Cancel procedure described in Non Patent Literature 2. In other words, the resource for the user data control described above is still secured after the Handover Cancel procedure described in Non Patent Literature 2 is completed. There is a risk that such an unnecessarily secured resource hinders a cellular network.

Thus, the present disclosure indicates a technique for appropriately releasing a resource for user data control being set by the Handover procedure from the 5GS to the EPS in the Handover Cancel procedure for the Handover procedure.

(Mobile Communication System According to Present Disclosure)

A mobile communication system according to the present disclosure will be described with reference to the drawings.

Figure 1:
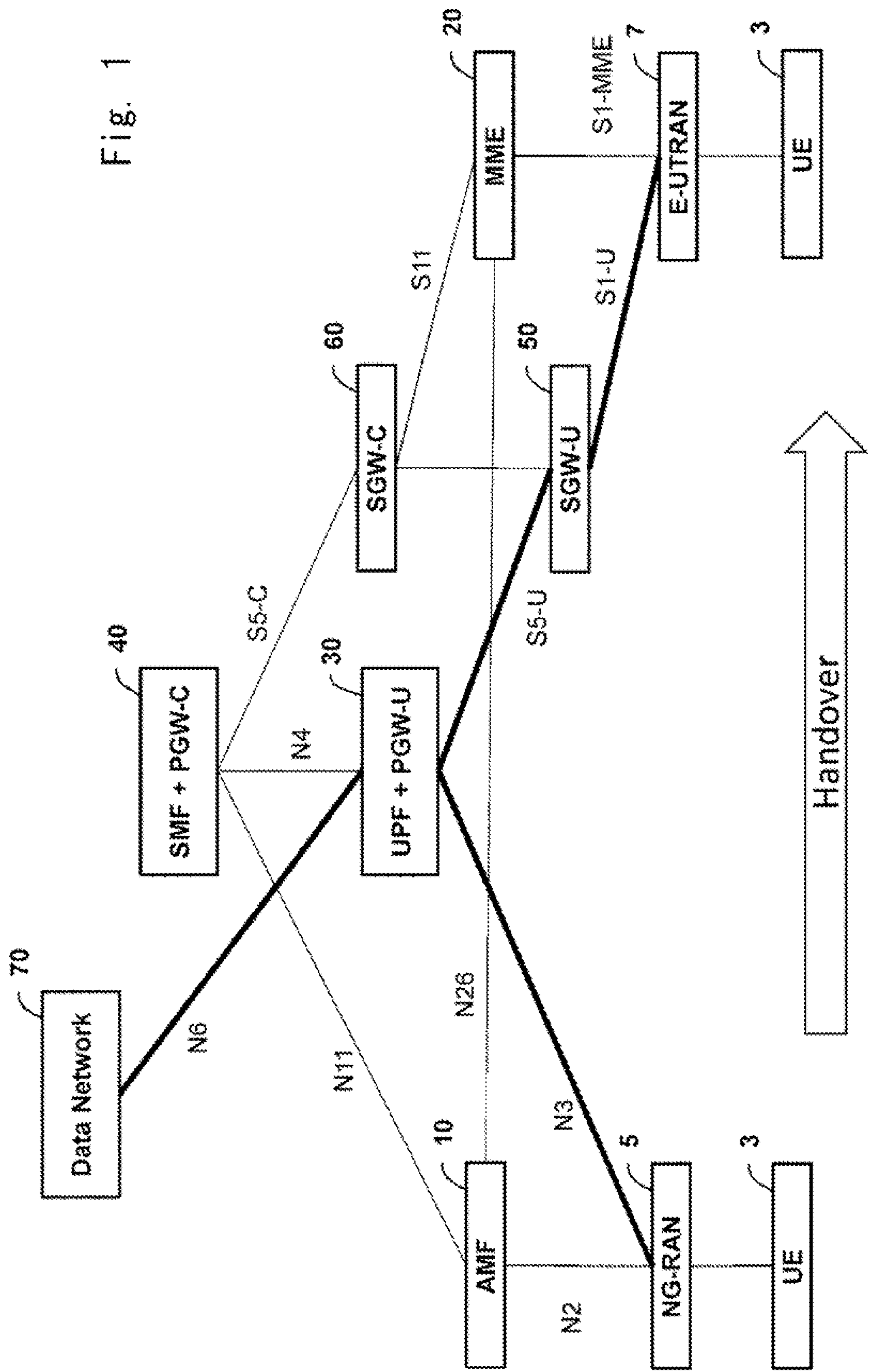
FIG. 1 is a schematic configuration diagram of a cellular network according to each aspect.
Figure 2:
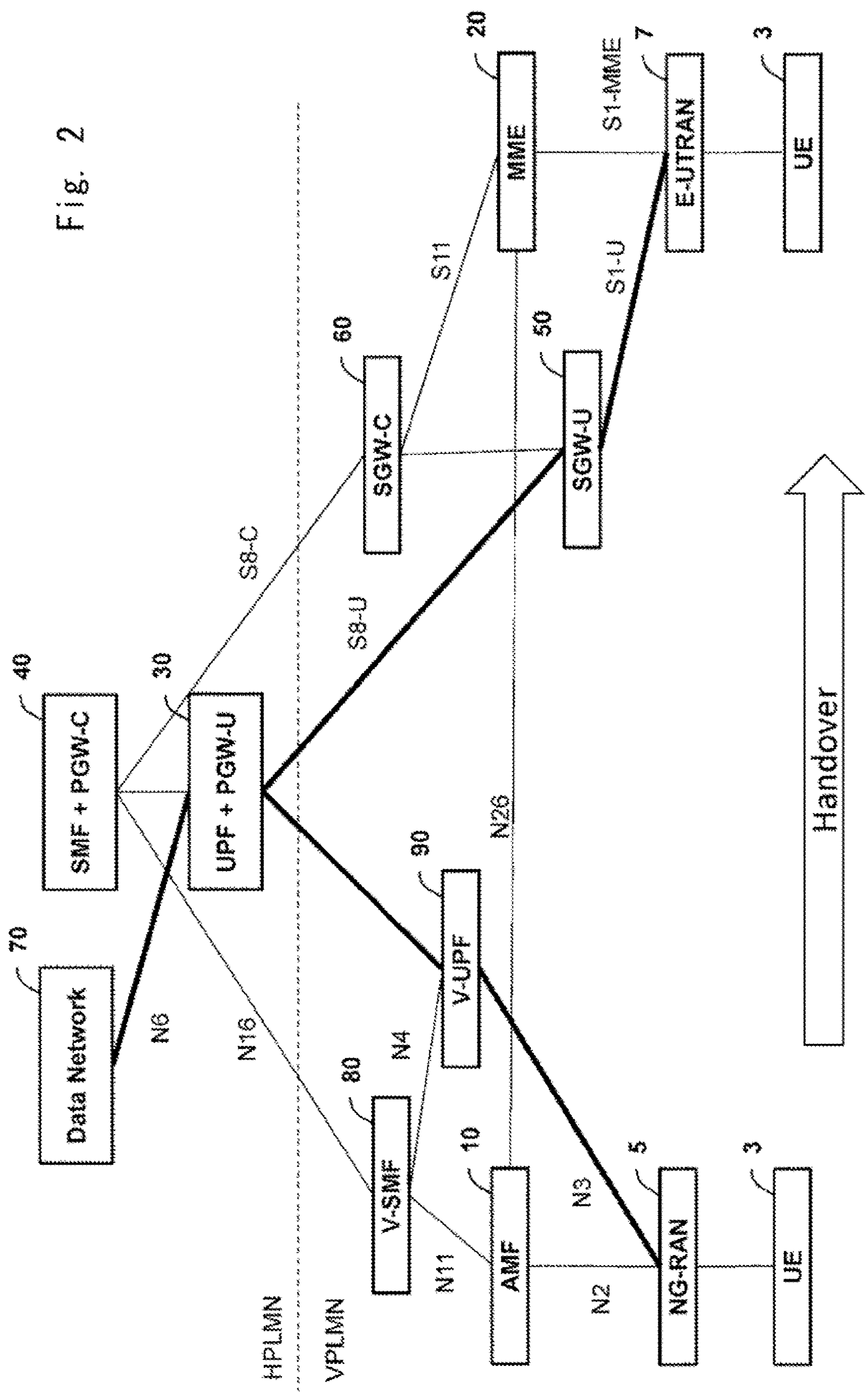
FIG. 2 is a schematic configuration diagram of a cellular network in a case of home-routed roaming according to each aspect.

FIGS. 1 and 2 illustrate a configuration example of a cellular network according to the present disclosure. Each element illustrated in FIGS. 1 and 2 is a network function, and provides an interface defined by a 3rd generation partnership project (3GPP). For example, each element (network function) illustrated in FIGS. 1 and 2 can be implemented as a network element on dedicated hardware, as a software instance running on the dedicated hardware, or as a virtualized function being instantiated on an application platform.

Figure 3:
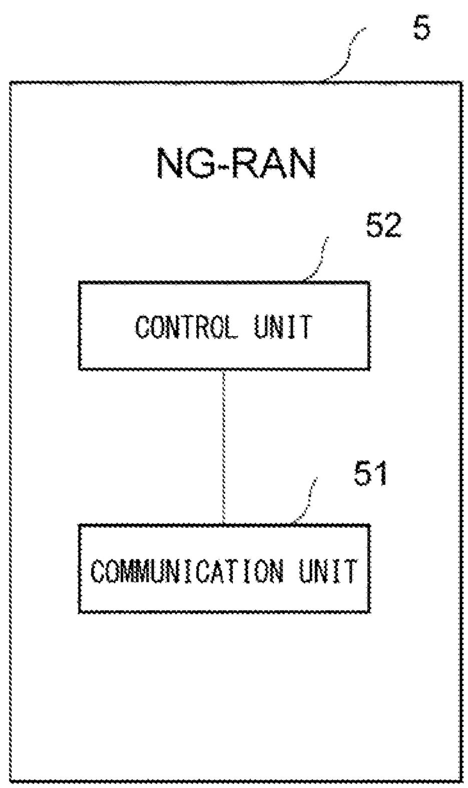
FIG. 3 is a configuration diagram of an NG-RAN according to each aspect.

FIG. 3 illustrates a configuration example of a next generation radio access network (NG-RAN) 5. Note that the NG-RAN 5 may be referred to as an NG-RAN node, for example. The NG-RAN 5 may be referred to as a source radio access network (RAN) associated with a 5GS. The NG-RAN 5 includes a communication unit 51 and a control unit 52. The communication unit 51 and the control unit 52 may be software or a module whose processing is performed by a processor executing a program stored in a memory. Alternatively, the communication unit 51 and the control unit 52 may be a circuit or hardware such as a chip.

The communication unit 51 is a functional unit for the NG-RAN 5 to be connected to a core network device included in an access network and a core network. In other words, the NG-RAN 5 can transmit and receive user data and/or control information to and from the core network device included in the access network and/or the core network via the communication unit 51. Note that the core network device may be referred to as a core network node.

The control unit 52 is a functional unit for controlling the NG-RAN 5, and achieves various types of processing of the entire NG-RAN 5 by reading and executing various types of information and programs being stored in a memory.

Details of the configuration example of the NG-RAN 5 described in a plurality of aspects described below will be described by using FIG. 4.

Figure 4:
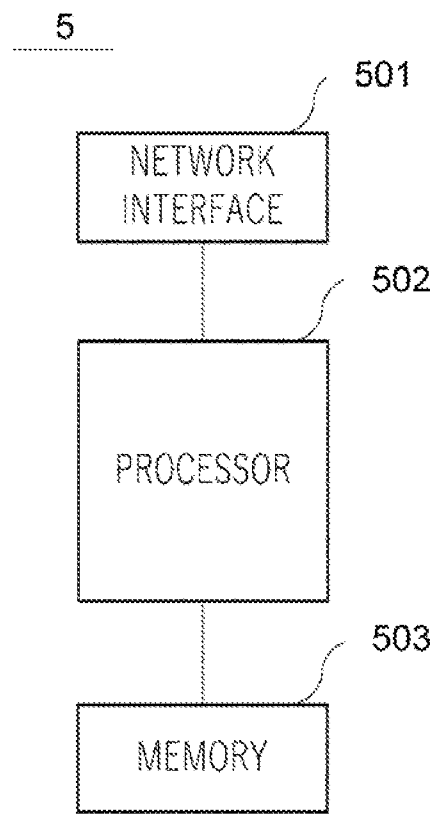
FIG. 4 is a block diagram illustrating a configuration example of the NG-RAN according to each aspect.

FIG. 4 is a block diagram illustrating the configuration example of the NG-RAN 5. With reference to FIG. 4, the NG-RAN 5 includes a network interface 501, a processor 502, and a memory 503. The network interface 501 is used for communicating with another network node device constituting a communication system. The network interface 501 may include, for example, a network interface card (NIC) conforming to IEEE 802.3 series.

The processor 502 performs processing of the NG-RAN 5 described by using a sequence diagram in the aspects described below by reading software (computer program) from the memory 503 and executing the software. The processor 502 may be, for example, a microprocessor, a micro processing unit (MPU), or a central processing unit (CPU). The processor 502 may include a plurality of processors.

The memory 503 is formed of a combination of a volatile memory and a non-volatile memory. The memory 503 may include a storage disposed away from the processor 502. In this case, the processor 502 may access the memory 503 via an I/O interface that is not illustrated.

In the example in FIG. 4, the memory 503 is used for storing a software module group. The processor 502 can perform the processing of the NG-RAN 5 described in the aspects described below by reading the software module group from the memory 503 and executing the software module group.

As described by using FIG. 4, each processor included in the NG-RAN 5 executes one or a plurality of programs including a command group for causing a computer to perform an algorithm described by using the drawings.

Figure 5:
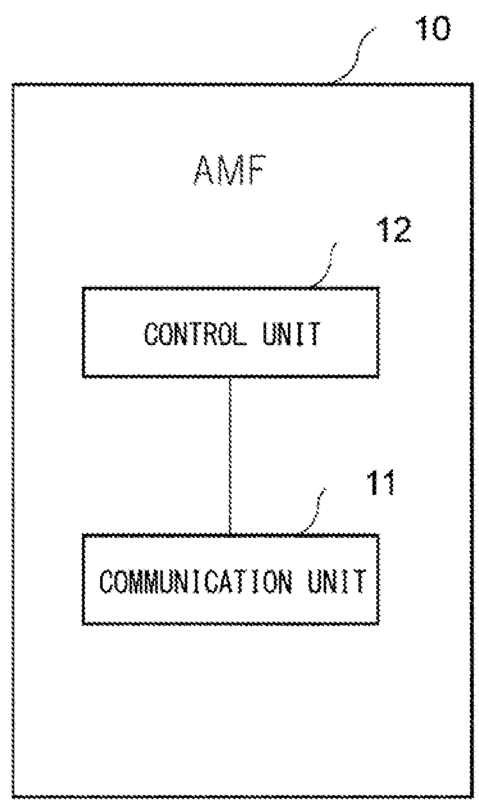
FIG. 5 is a configuration diagram of an AMF according to each aspect.

FIG. 5 illustrates a configuration example of an access and mobility management function 10. The AMF 10 may be referred to as an AMF device. The AMF 10 may be referred to as a core network node associated with the 5GS. The AMF 10 includes a communication unit 11 and a control unit 12. The communication unit 11 and the control unit 12 may be software or a module whose processing is performed by a processor executing a program stored in a memory. Alternatively, the communication unit 11 and the control unit 12 may be a circuit or hardware such as a chip.

The communication unit 11 is a functional unit for the AMF 10 to be connected to a core network device included in an access network and a core network. In other words, the AMF 10 can transmit and receive user data and/or control information to and from the core network device included in the access network and/or the core network via the communication unit 11.

The control unit 12 is a functional unit for controlling the AMF 10, and achieves various types of processing of the entire AMF 10 by reading and executing various types of information and programs being stored in a memory.

Details of the configuration example of the AMF 10 described in the plurality of aspects described below will be described by using FIG. 6.

Figure 6:
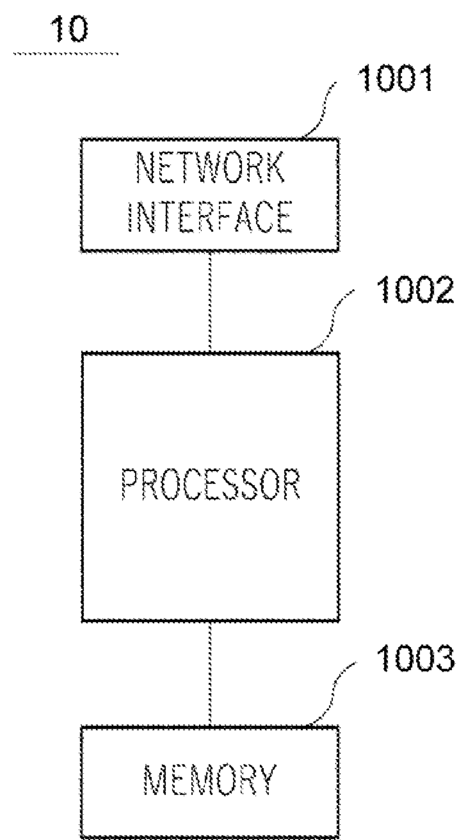
FIG. 6 is a block diagram illustrating a configuration example of the AMF according to each aspect.

FIG. 6 is a block diagram illustrating the configuration example of the AMF 10. With reference to FIG. 6, the AMF 10 includes a network interface 1001, a processor 1002, and a memory 1003. The network interface 1001 is used for communicating with another network node device constituting a communication system. The network interface 1001 may include, for example, a network interface card (NIC) conforming to IEEE 802.3 series.

The processor 1002 performs processing of the AMF 10 described by using a sequence diagram in the aspects described below by reading software (computer program) from the memory 1003 and executing the software. The processor 1002 may be, for example, a microprocessor, a micro processing unit (MPU), or a central processing unit (CPU). The processor 1002 may include a plurality of processors.

The memory 1003 is formed of a combination of a volatile memory and a non-volatile memory. The memory 1003 may include a storage disposed away from the processor 1002. In this case, the processor 1002 may access the memory 1003 via an I/O interface that is not illustrated.

In the example in FIG. 6, the memory 1003 is used for storing a software module group. The processor 1002 can perform the processing of the AMF 10 described in the aspects described below by reading the software module group from the memory 1003 and executing the software module group.

As described by using FIG. 6, each processor included in the AMF 10 executes one or a plurality of programs including a command group for causing a computer to perform an algorithm described by using the drawings.

Figure 7:
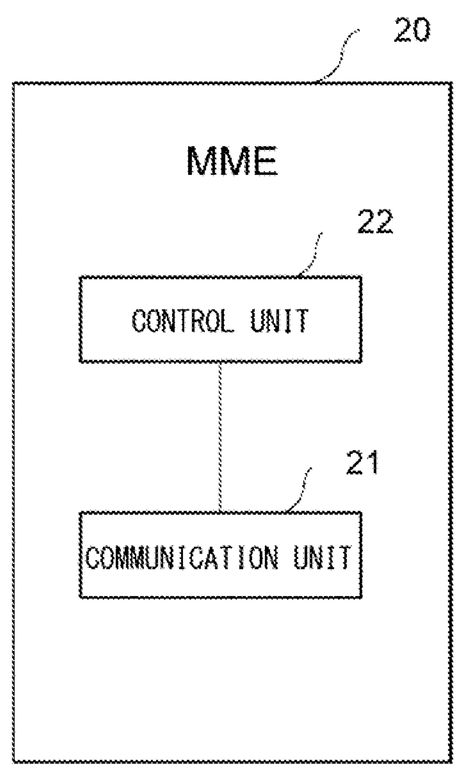
FIG. 7 is a configuration diagram of an MME according to each aspect.

FIG. 7 illustrates a configuration example of a mobile management entity (MME) 20. The MME 20 may be referred to as an MME device. The MME 20 may be referred to as a core network node associated with the EPS. The MME 20 includes a communication unit 21 and a control unit 22. The communication unit 21 and the control unit 22 may be software or a module whose processing is performed by a processor executing a program stored in a memory.

Alternatively, the communication unit 21 and the control unit 22 may be a circuit or hardware such as a chip.

The communication unit 21 is a functional unit for the MME 20 to be connected to a core network device included in an access network and a core network. In other words, the MME 20 can transmit and receive user data and/or control information to and from the core network device included in the core network via the communication unit 21.

The control unit 22 is a functional unit for controlling the MME 20, and achieves various types of processing of the entire MME 20 by reading and executing various types of information and programs being stored in a memory.

Details of the configuration example of the MME 20 described in the plurality of aspects described below will be described by using FIG. 8.

Figure 8:
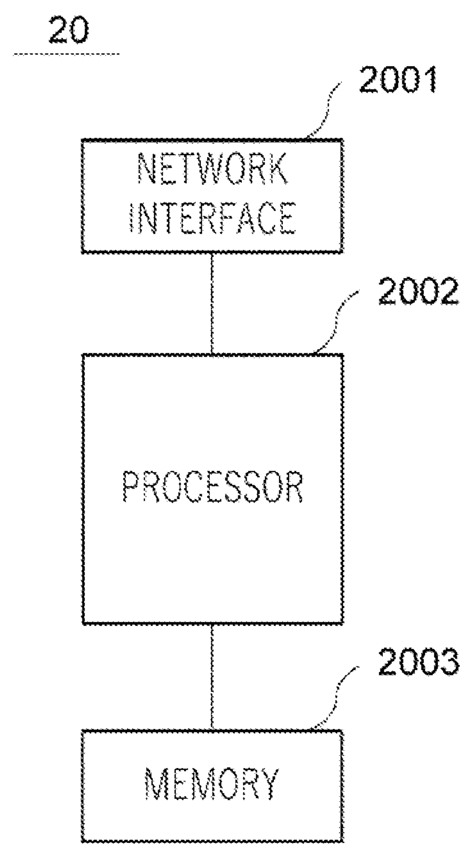
FIG. 8 is a block diagram illustrating a configuration example of the MME according to each aspect.

FIG. 8 is a block diagram illustrating the configuration example of the MME 20. With reference to FIG. 8, the MME 20 includes a network interface 2001, a processor 2002, and a memory 2003. The network interface 2001 is used for communicating with another network node device constituting a communication system. The network interface 2001 may include, for example, a network interface card (NIC) conforming to IEEE 802.3 series.

The processor 2002 performs processing of the MME 20 described by using a sequence diagram in the aspects described below by reading software (computer program) from the memory 2003 and executing the software. The processor 2002 may be, for example, a microprocessor, a micro processing unit (MPU), or a central processing unit (CPU). The processor 2002 may include a plurality of processors.

The memory 2003 is formed of a combination of a volatile memory and a non-volatile memory. The memory 2003 may include a storage disposed away from the processor 2002. In this case, the processor 2002 may access the memory 2003 via an I/O interface that is not illustrated.

In the example in FIG. 8, the memory 2003 is used for storing a software module group. The processor 2002 can perform the processing of the MME 20 described in the aspects described below by reading the software module group from the memory 2003 and executing the software module group.

As described by using FIG. 8, each processor included in the MME 20 executes one or a plurality of programs including a command group for causing a computer to perform an algorithm described by using the drawings.

Figure 9:
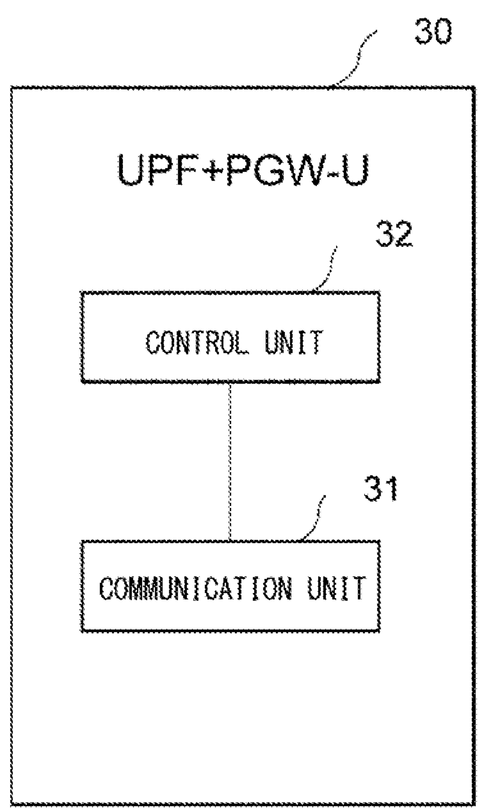
FIG. 9 is a configuration diagram of a UPF+PGW-U according to each aspect.

FIG. 9 illustrates a configuration example of a user plane function+packet data network gateway-U (UPF+PGW-U) 30. The UPF+PGW-U 30 may be referred to as a UPF+PGW-U device. The UPF+PGW-U 30 may be referred to as a user plane device or a core network device. The UPF+PGW-U 30 includes a communication unit 31 and a control unit 32. The communication unit 31 and the control unit 32 may be software or a module whose processing is performed by a processor executing a program stored in a memory. Alternatively, the communication unit 31 and the control unit 32 may be a circuit or hardware such as a chip.

The communication unit 31 is a functional unit for the UPF+PGW-U 30 to be connected to a core network device included in an access network and a core network. In other words, the UPF+PGW-U 30 can transmit and receive user data and/or control information to and from the core network device included in the core network via the communication unit 31.

The control unit 32 is a functional unit for controlling the UPF+PGW-U 30, and achieves various types of processing of the entire UPF+PGW-U 30 by reading and executing various types of information and programs being stored in a memory.

Details of the configuration example of the UPF+PGW-U 30 described in the plurality of aspects described below will be described by using FIG. 10.

Figure 10:
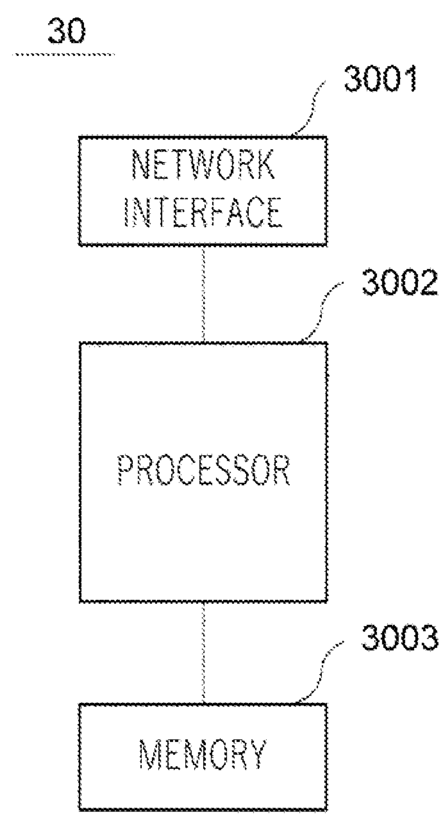
FIG. 10 is a block diagram illustrating a configuration example of the UPF+PGW-U according to each aspect.

FIG. 10 is a block diagram illustrating the configuration example of the UPF+PGW-U 30. With reference to FIG. 10, the UPF+PGW-U 30 includes a network interface 3001, a processor 3002, and a memory 3003. The network interface 3001 is used for communicating with another network node device constituting a communication system. The network interface 3001 may include, for example, a network interface card (NIC) conforming to IEEE 802.3 series.

The processor 3002 performs processing of the UPF+PGW-U 30 described by using a sequence diagram in the aspects described below by reading software (computer program) from the memory 3003 and executing the software. The processor 3002 may be, for example, a microprocessor, a micro processing unit (MPU), or a central processing unit (CPU). The processor 3002 may include a plurality of processors.

The memory 3003 is formed of a combination of a volatile memory and a non-volatile memory. The memory 3003 may include a storage disposed away from the processor 3002. In this case, the processor 3002 may access the memory 3003 via an I/O interface that is not illustrated.

In the example in FIG. 10, the memory 3003 is used for storing a software module group. The processor 3002 can perform the processing of the UPF+PGW-U 30 described in the aspects described below by reading the software module group from the memory 3003 and executing the software module group.

As described by using FIG. 10, each processor included in the UPF+PGW-U 30 executes one or a plurality of programs including a command group for causing a computer to perform an algorithm described by using the drawings.

Figure 11:
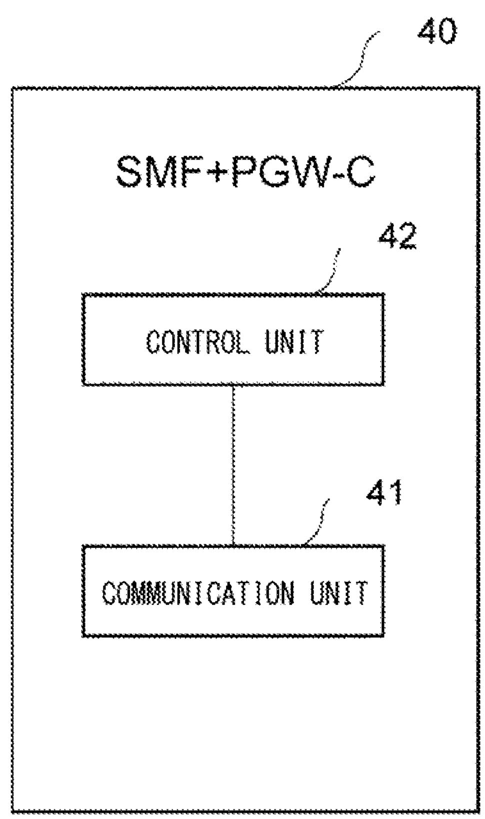
FIG. 11 is a configuration diagram of an SMF+PGW-C according to each aspect.

FIG. 11 illustrates a configuration example of a session management function+packet data network gateway-C (SMF+PGW-C) 40. The SMF+PGW-C 40 may be referred to as a SMF+PGW-C device. The SMF+PGW-C 40 may be referred to as a core network device. The SMF+PGW-C 40 includes a communication unit 41 and a control unit 42. The communication unit 41 and the control unit 42 may be software or a module whose processing is performed by a processor executing a program stored in a memory. Alternatively, the communication unit 41 and the control unit 42 may be a circuit or hardware such as a chip.

The communication unit 41 is a functional unit for the SMF+PGW-C 40 to be connected to a core network device included in an access network and a core network. In other words, the SMF+PGW-C 40 can transmit and receive user data and/or control information to and from the core network device included in the core network via the communication unit 41.

The control unit 42 is a functional unit for controlling the SMF+PGW-C 40, and achieves various types of processing of the entire SMF+PGW-C 40 by reading and executing various types of information and programs being stored in a memory.

Details of the configuration example of the SMF+PGW-C 40 described in the plurality of aspects described below will be described by using FIG. 12.

Figure 12:
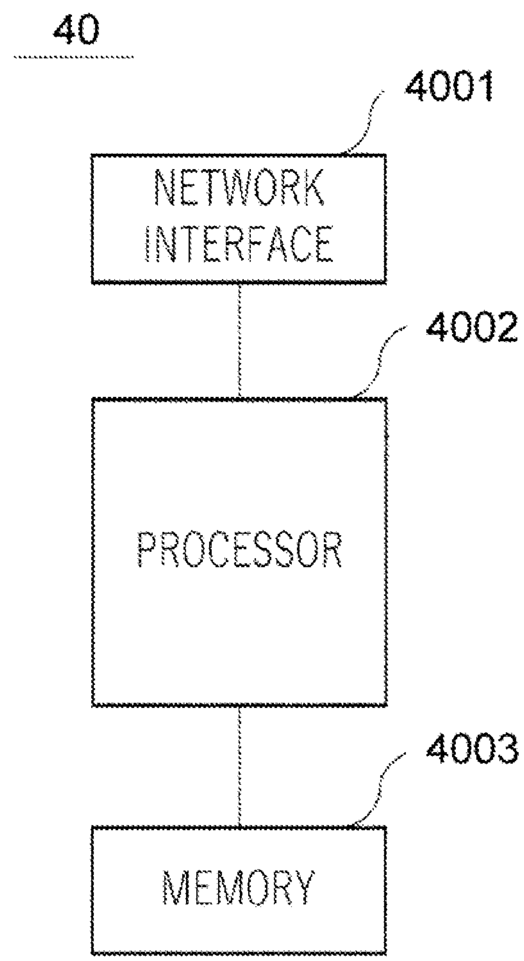
FIG. 12 is a block diagram illustrating a configuration example of the SMF+PGW-C according to each aspect.

FIG. 12 is a block diagram illustrating the configuration example of the SMF+PGW-C 40. With reference to FIG. 12, the SMF+PGW-C 40 includes a network interface 4001, a processor 4002, and a memory 4003. The network interface 4001 is used for communicating with another network node device constituting a communication system. The network interface 4001 may include, for example, a network interface card (NIC) conforming to IEEE 802.3 series.

The processor 4002 performs processing of the SMF+PGW-C 40 described by using a sequence diagram in the aspects described below by reading software (computer program) from the memory 4003 and executing the software. The processor 4002 may be, for example, a microprocessor, a micro processing unit (MPU), or a central processing unit (CPU). The processor 4002 may include a plurality of processors.

The memory 4003 is formed of a combination of a volatile memory and a non-volatile memory. The memory 4003 may include a storage disposed away from the processor 4002. In this case, the processor 4002 may access the memory 4003 via an I/O interface that is not illustrated.

In the example in FIG. 12, the memory 4003 is used for storing a software module group. The processor 4002 can perform the processing of the SMF+PGW-C 40 described in the aspects described below by reading the software module group from the memory 4003 and executing the software module group.

As described by using FIG. 12, each processor included in the SMF+PGW-C 40 executes one or a plurality of programs including a command group for causing a computer to perform an algorithm described by using the drawings.

Figure 13:
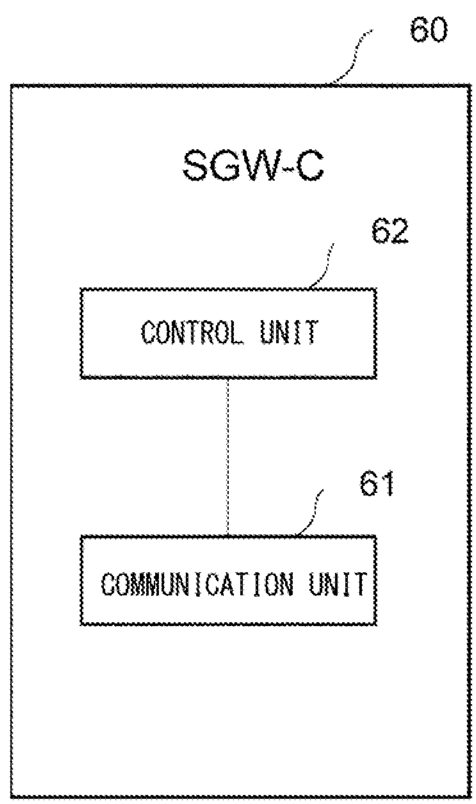
FIG. 13 is a configuration diagram of an SGW-C according to each aspect.

FIG. 13 illustrates a configuration example of a serving gateway control plane function (SGW-C) 60. The SGW-C 60 may be referred to as an SGW-C device. The SGW-C 60 may be referred to as a core network device. The SGW-C 60 includes a communication unit 61 and a control unit 62. The communication unit 61 and the control unit 62 may be software or a module whose processing is performed by a processor executing a program stored in a memory. Alternatively, the communication unit 61 and the control unit 12 may be a circuit or hardware such as a chip.

The communication unit 61 is a functional unit for the SGW-C 60 to be connected to a core network device included in an access network and a core network. In other words, the SGW-C 60 can transmit and receive user data and/or control information to and from the core network device included in the core network via the communication unit 61.

The control unit 62 is a functional unit for controlling the SGW-C 60, and achieves various types of processing of the entire SGW-C 60 by reading and executing various types of information and programs being stored in a memory.

Details of the configuration example of the SGW-C 60 described in the plurality of aspects described below will be described by using FIG. 14.

Figure 14:
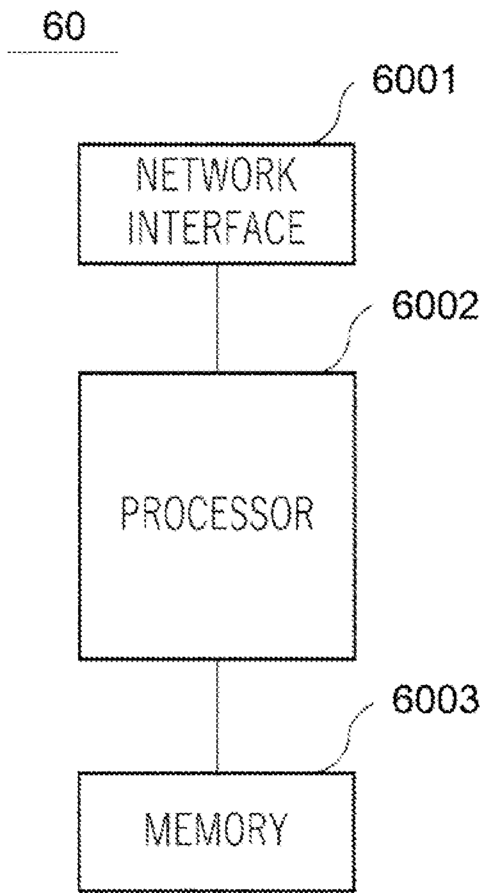
FIG. 14 is a block diagram illustrating a configuration example of the SGW-C according to each aspect.

FIG. 14 is a block diagram illustrating the configuration example of the SGW-C 60. With reference to FIG. 14, the SGW-C 60 includes a network interface 6001, a processor 6002, and a memory 6003. The network interface 6001 is used for communicating with another network node device constituting a communication system. The network interface 6001 may include, for example, a network interface card (NIC) conforming to IEEE 802.3 series.

The processor 6002 performs processing of the SGW-C 60 described by using a sequence diagram in the aspects described below by reading software (computer program) from the memory 6003 and executing the software. The processor 6002 may be, for example, a microprocessor, a micro processing unit (MPU), or a central processing unit (CPU). The processor 6002 may include a plurality of processors.

The memory 6003 is formed of a combination of a volatile memory and a non-volatile memory. The memory 6003 may include a storage disposed away from the processor 6002. In this case, the processor 6002 may access the memory 6003 via an I/O interface that is not illustrated.

In the example in FIG. 14, the memory 6003 is used for storing a software module group. The processor 6002 can perform the processing of the SGW-C 60 described in the aspects described below by reading the software module group from the memory 6003 and executing the software module group.

As described by using FIG. 14, each processor included in the SGW-C 60 executes one or a plurality of programs including a command group for causing a computer to perform an algorithm described by using the drawings.

Figure 15:
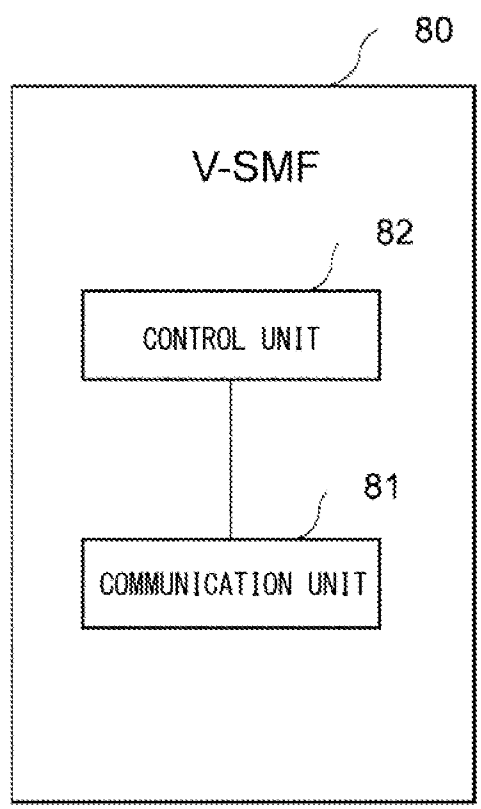
FIG. 15 is a configuration diagram of a V-SMF according to each aspect.

FIG. 15 illustrates a configuration example of a visited session management function (V-SMF) 80. The V-SMF 80 may be referred to as a V-SMF device. The V-SMF 80 may be referred to as a core network device. The V-SMF 80 includes a communication unit 81 and a control unit 82. The communication unit 81 and the control unit 82 may be software or a module whose processing is performed by a processor executing a program stored in a memory. Alternatively, the communication unit 81 and the control unit 82 may be a circuit or hardware such as a chip.

The communication unit 81 is a functional unit for the V-SMF 80 to be connected to a core network device included in an access network and a core network. In other words, the V-SMF 80 can transmit and receive user data and/or control information to and from the core network device included in the core network via the communication unit 81.

The control unit 82 is a functional unit for controlling the V-SMF 80, and achieves various types of processing of the entire V-SMF 80 by reading and executing various types of information and programs being stored in a memory.

Details of the configuration example of the V-SMF 80 described in the plurality of aspects described below will be described by using FIG. 16.

Figure 16:
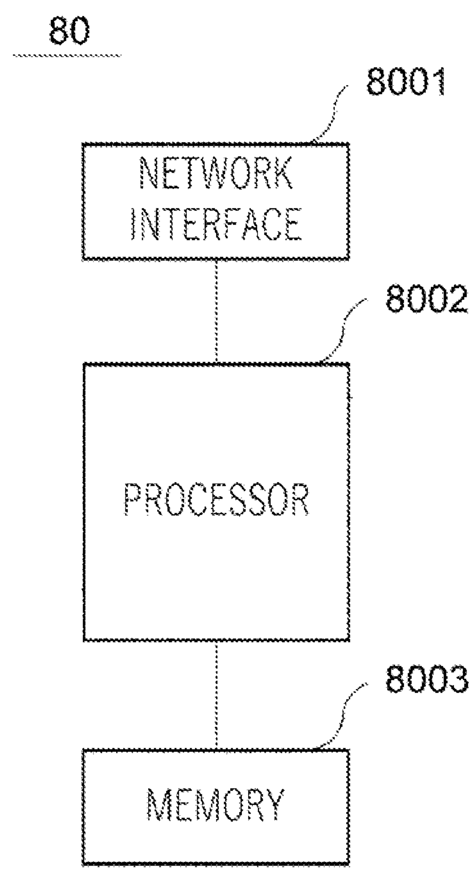
FIG. 16 is a block diagram illustrating a configuration example of the V-SMF according to each aspect.

FIG. 16 is a block diagram illustrating the configuration example of the V-SMF 80. With reference to FIG. 16, the V-SMF 80 includes a network interface 8001, a processor 8002, and a memory 8003. The network interface 8001 is used for communicating with another network node device constituting a communication system. The network interface 8001 may include, for example, a network interface card (NIC) conforming to IEEE 802.3 series.

The processor 8002 performs processing of the V-SMF 80 described by using a sequence diagram in the aspects described below by reading software (computer program) from the memory 8003 and executing the software. The processor 8002 may be, for example, a microprocessor, a micro processing unit (MPU), or a central processing unit (CPU). The processor 8002 may include a plurality of processors.

The memory 8003 is formed of a combination of a volatile memory and a non-volatile memory. The memory 8003 may include a storage disposed away from the processor 8002. In this case, the processor 8002 may access the memory 8003 via an I/O interface that is not illustrated.

In the example in FIG. 16, the memory 8003 is used for storing a software module group. The processor 8002 can perform the processing of the V-SMF 80 described in the aspects described below by reading the software module group from the memory 8003 and executing the software module group.

As described by using FIG. 16, each processor included in the V-SMF 80 executes one or a plurality of programs including a command group for causing a computer to perform an algorithm described by using the drawings.

In the example described above, the program may be stored by using various types of non-transitory computer-readable mediums, and may be supplied to a computer. The non-transitory computer-readable medium includes various types of tangible storage mediums. Examples of the non-transitory computer-readable medium include a magnetic recording medium (for example, a flexible disk, a magnetic tape, a hard disk drive), and a magneto-optical recording medium (for example, a magneto-optical disk). Moreover, examples of the non-transitory computer-readable medium include a CD-ROM (read only memory), a CD-R, and a CD-R/W. Moreover, examples of the non-transitory computer-readable medium include a semiconductor memory. The semiconductor memory includes, for example, a mask ROM, a programmable ROM (PROM), an erasable PROM (EPROM), a flash ROM, and a random access memory (RAM). Further, the program may be supplied to the computer by various types of transitory computer-readable mediums. Examples of the transitory computer-readable medium include an electrical signal, an optical signal, and an electromagnetic wave. The transitory computer-readable medium may supply the program to the computer via a wired communication path such as an electric wire and an optical fiber or a wireless communication path.

A procedure example according to each aspect will be described as follows, but a main term and main information will be described before the description. Note that the information in each aspect may be information included on a message transmitted and received between UE and an AMF, may be information held in the UE, or may be information held in a core network.

The core network refers to at least a part of the AMF 10, the MME 20, the UPF+PGW-U 30, the SMF+PGW-C 40, an SGW-U 50, the SGW-C 60, the V-SMF 80, and a V-UPF 90. Further, at least a part of the AMF 10, the MME 20, the UPF+PGW-U 30, the SMF+PGW-C 40, the SGW-U 50, the SGW-C 60, the V-SMF 80, and the V-UPF 90 may be referred to as a core network device or a core network node. In other words, a fact that the core network transmits and receives a message and/or performs a procedure means that a device (for example, a core network node) in the core network transmits and receives a message and/or performs a procedure.

An access network is a wireless network that connects the UE and the core network. The access network may be a 3GPP network, or a non-3GPP network. The 3GPP network refers to the NG-RAN 5 or an E-UTRAN 7, and may be referred to as an NG-RAN, an NG-RAN device, an NG-RAN node, an NG-(R)AN, an NG-(R)AN device, an NG-(R)AN node, an E-UTRAN, an E-UTRAN device, or an E-UTRAN node. In other words, a fact that the NG-RAN transmits and receives a message and/or performs a procedure means that a device (for example, an NG-RAN node) in the NG-RAN transmits and receives a message and/or performs a procedure. Further, a fact that the E-UTRAN transmits and receives a message and/or performs a procedure means that a device (for example, an eNB) in the E-UTRAN transmits and receives a message and/or performs a procedure.

Note that the NG-RAN 5 or the NG-RAN node may be a gNB having a new radio (NR) function constituting the NG-RAN. The NG-RAN 5 may be an eNB having an evolved universal terrestrial radio access (E-UTRA) function constituting the NG-(R)AN. Further, the E-UTRAN 7 may be an eNB constituting the E-UTRAN. Further, when the 5GS accommodates the non-3GPP network, the NG-RAN 5 may be replaced with a non-3GPP interworking function (N31WF) or a trusted non-3GPP gateway function (TNGF) disclosed in Chapter 4.3.3 in Non Patent Literature 1.

User equipment (UE) 3 uses at least one of a 5G connectivity service and a 4G connectivity service, and communicates with a data network (DN) 70. The UE 3 may be referred to as a terminal, a wireless terminal, a wireless communication terminal, a wireless device, a user terminal, a user device, or the like. The UE 3 is connected to the NG-RAN 5 or the E-UTRAN 7 being the access network, and communicates with the data network 70 via the user plane device UPF+PGS-U 30, SGW-U 50, or V-UPF 90 in the core network. The UE 3 establishes one or more PDU sessions or PDN connections between the UE 3 and the UPF+PGW-U 30 (for example, a session anchor device connected to the data network 70). The session anchor device may be referred to as a PDU session anchor-UPF (PSA-UPF).

(Example of Handover Preparation Procedure Common to First Aspect and Second Aspect)

A Handover Preparation procedure common to a first aspect and a second aspect in the present disclosure will be described. The Handover Preparation procedure (Handover preparing procedure) is included in a Handover procedure.

An example of the Handover procedure included in FIG. 17 will be described in detail as follows.

Figure 17:
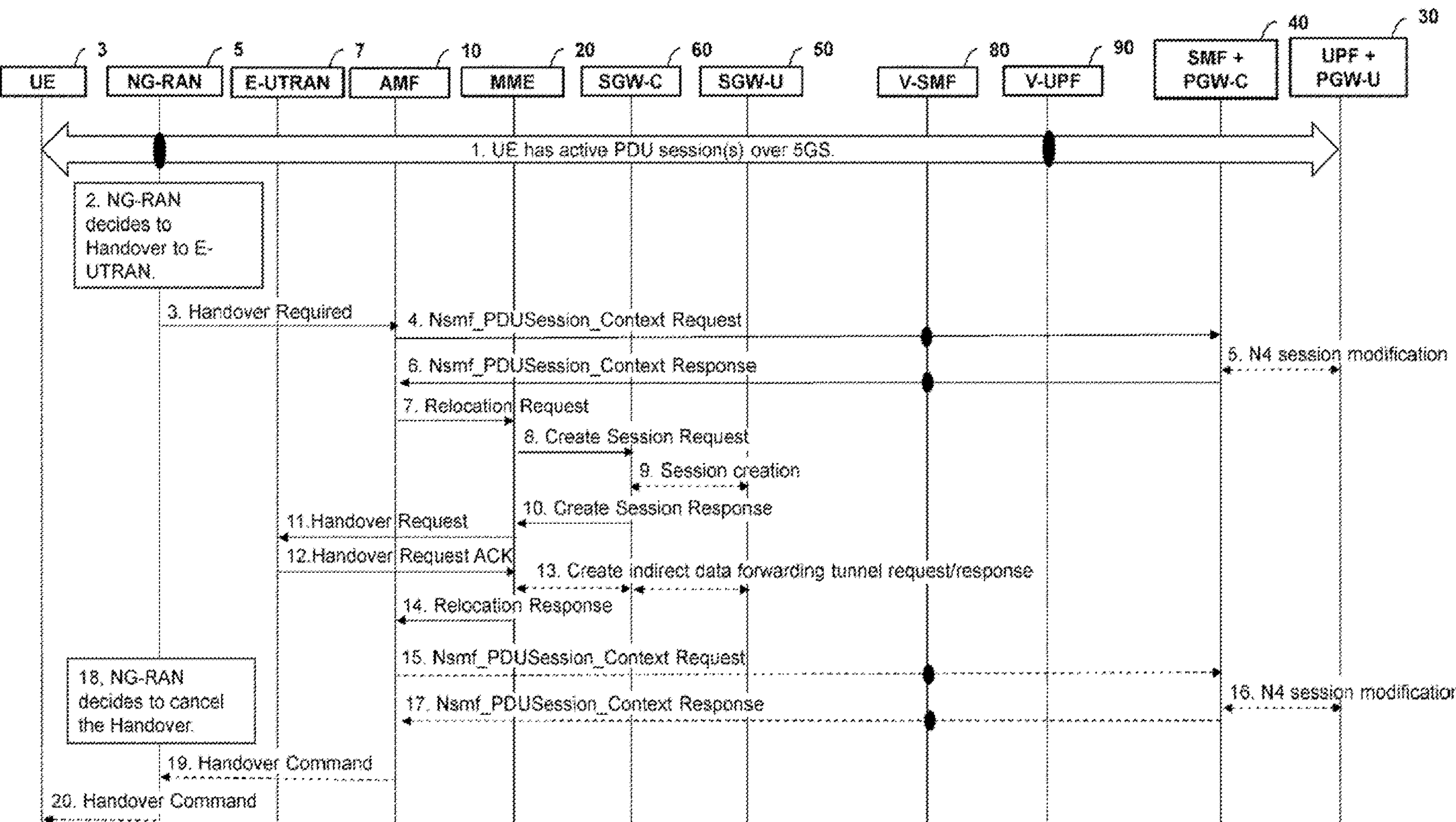
FIG. 17 is a diagram illustrating a procedure of Handover Preparation common to a first aspect and a second aspect.

A Handover Cancel procedure for the Handover procedure from the 5GS to the EPS occurs at any timing from when a Handover Required message illustrated in step 3 in FIG. 17 is transmitted from the NG-RAN 5 to the AMF 10 to when a Handover Command message illustrated in step 20 is transmitted from the NG-RAN 5 to the UE 3. In the example in FIG. 17, the Handover Cancel procedure starts in response to a decision of Handover Cancel by the NG-RAN 5 at a timing in step 18. The decision of the Handover Cancel may be referred to as a decision of cancel of the Handover procedure. In FIG. 17, an operation of transmitting the Handover Command message to the UE 3 in steps 19 and 20 is illustrated, but, when the NG-RAN 5 decides the Handover Cancel in step 18, at least step 20 is not performed. In other words, steps 19 and 20 are illustrated for the sake of convenience in the description of the Handover Cancel procedure.

Steps (1): The UE 3 communicates with the data network 70 via the NG-RAN 5. The UE 3 may construct one or a plurality of PDU sessions.

Step (2): The NG-RAN 5 decides Handover of communication with the UE 3 to the E-UTRAN 7. As an example of the decision, the NG-RAN 5 decides that signal degradation occurs by monitoring a communication state with the UE 3, and the NG-RAN 5 decides Handover of the communication with the UE 3 to the E-UTRAN 7. Further, for example, when the NG-RAN 5 determines that the E-UTRAN 7 located near an area covered by the NG-RAN 5 is optimum for communication with the UE 3, the NG-RAN 5 may decide Handover of the communication with the UE 3 to the E-UTRAN 7. Specifically, the signal degradation described above occurs when the UE 3 leaves a coverage of the NG-RAN 5 by moving from the coverage, and the like. Note that the NG-RAN 5 may be referred to as a source RAN device, a source RAN node, a source RAN, a source RAN associated with the 5GS, a source RAN device associated with the 5GS, or a source RAN node associated with the 5GS.

Step (3): The NG-RAN 5 transmits the Handover Required message to the AMF 10. For example, when the NG-RAN 5 decides Handover of the communication with the UE 3 to the E-UTRAN 7, the NG-RAN 5 may transmit the Handover Required message to the AMF 10. Note that the AMF 10 may be referred to as a source AMF, a source core network device, a source core network node, a source core network device associated with the 5GS, or a source core network node associated with the 5GS.

Step (4): The AMF 10 that receives the Handover Required message from the NG-RAN 5 transmits an Nsmf_PDUSession_Context Request to the SMF+PGW-C 40, and notifies activation of Handover to the EPS. However, in a case of Home-routed roaming, the SMF+PGW-C 40 and the UPF+PGW-U 30 are located in a home public land mobile network (HPLMN). In this case, the AMF 10 transmits the Nsmf_PDUSession_Context Request to the V-SMF 80 located in a visited public land mobile network (VPLMN). The V-SMF 80 that receives the Nsmf_PDUSession_Context Request transmits the Nsmf_PDUSession_Context Request to the SMF+PGW-C 40. Note that the Nsmf_PDUSession_Context Request may be referred to as an Nsmf_PDUSession_Context Request message.

Step (5): When the SMF+PGW-C 40 that receives the Nsmf_PDUSession_Context Request determines that Handover of a PDU session during current communication to the EPS can be performed, the SMF+PGW-C 40 instructs the UPF+PGW-U 30 to secure a resource (for example, a user plane resource) for transmission using the EPS. The resource may be referred to as a session resource. The UPF+PGW-U 30 that receives the instruction secures the resource for the transmission using the EPS. For example, when the UPF+PGW-U 30 secures the resource, the UPF+PGW-U 30 may notify the SMF+PGW-C 40 that the resource is secured. Note that the UPF+PGW-U 30 may be referred to as a core network device or a core network node.

Step (6): The SMF+PGW-C 40 transmits an Nsmf_PDUSession_Context Response to the AMF 10. In a case of Home-routed roaming, the SMF+PGW-C 40 transmits the Nsmf_PDUSession_Context Response to the V-SMF 80. The V-SMF 80 that receives the Nsmf_PDUSession_Context Response transmits the Nsmf_PDUSession_Context Response to the AMF 10. For example, when the SMF+PGW-C 40 receives, from the UPF+PGW-U 30, the notification indicating that the resource for the transmission using the EPS is secured, the SMF+PGW-C 40 may transmit the Nsmf_PDUSession_Context Response to the AMF 10 or the V-SMF 80. Note that the Nsmf_PDUSession_Context Response may be referred to as an Nsmf_PDUSession_Context Response message.

Step (7): The AMF 10 transmits a Relocation Request message to the MME 20. For example, when the AMF 10 receives the Nsmf_PDUSession_Context Response, the AMF 10 may transmit the Relocation Request message to the MME 20. Note that the MME 20 may be referred to as a target MME, a target core network device, a target core network node, a target core network device associated with the EPS, or a target core network node associated with the EPS.

Steps (8 to 10): The MME 20 transmits a Create Session Request message to the SGW-C 60, and provides an instruction to secure, in the SGW-U 50, a resource (for example, a user plane resource) for communication being used by the UE 3 after Handover to the EPS. For example, when the MME 20 receives the Relocation Request message, the MME 20 may transmit the Create Session Request message to the SGW-C 60. The SGW-C 60 that receives the Create Session Request message instructs the SGW-U 50 to secure the resource for the communication being used by the UE 3 after the Handover to the EPS. The SGW-U 50 that receives the instruction secures the resource for the communication. For example, when the SGW-U 50 secures the resource for the communication, the SGW-U 50 may notify the SGW-C 60 that the resource for the communication is secured. The SGW-C 60 transmits a Create Session Response message to the MME 20 after the resource for the communication is secured in the SGW-U 50. For example, when the SGW-C 60 receives, from the SGW-U 50, the notification indicating that the resource for the communication is secured, the SGW-C 60 may transmit the Create Session Response message to the MME 20.

Steps (11 to 12): The MME 20 transmits a Handover Request message to the E-UTRAN 7, and provides an instruction to secure, in the E-UTRAN 7, a resource (for example, a user plane resource) for communication being used by the UE 3 after Handover to the EPS. For example, when the MME 20 receives the Create Session Response message, the MME 20 may transmit the Handover Request message to the E-UTRAN 7. The E-UTRAN 7 secures the resource for the communication being used by the UE 3 after the Handover to the EPS. The E-UTRAN 7 transmits a Handover Request Ack message to the MME 20 after the resource for the communication is secured in the E-UTRAN 7.

Step (13): The MME 20 determines whether to perform Indirect data forwarding. The Indirect data forwarding is a mechanism for transferring user data in such a way that, for example, when Down Link user data transmitted for the UE 3 during execution of Handover arrives at the NG-RAN 5 being a Handover source, the Down Link user data are transmitted to the UE 3 via the SGW-U 50 and the E-UTRAN 7 being a Handover destination. When the MME 20 determines that the Indirect data forwarding is performed, the MME 20 transmits a Create Indirect data forwarding tunnel request message to the SGW-C 60, and provides an instruction to secure, in the SGW-U 50, a resource (for example, a resource for a tunnel in which user data are transferred) for performing the Indirect data forwarding. The SGW-C 60 that receives the Create Indirect data forwarding tunnel request message instructs the SGW-U 50 to secure the resource for performing the Indirect data forwarding. The SGW-U 50 secures the resource for performing the Indirect data forwarding. For example, when the SGW-U 50 secures the resource for performing the Indirect data forwarding, the SGW-U 50 may notify the SGW-C 60 that the resource for performing the Indirect data forwarding is secured. The SGW-C 60 transmits a Create Indirect data forwarding tunnel Response message to the MME 20 after the resource for performing the Indirect data forwarding is secured in the SGW-U 50. For example, when the SGW-C 60 receives, from the SGW-U 50, the notification indicating that the resource for performing the Indirect data forwarding is secured, the SGW-C 60 may transmit the Create Indirect data forwarding tunnel Response message to the MME 20.

Step (14): The MME 20 transmits a Relocation Response message to the AMF 10. For example, when the MME 20 receives the Handover Request Ack message or receives the Create Indirect data forwarding tunnel Response message, the MME 20 may transmit the Relocation Response message to the AMF 10.

Step (15): When information indicating the resource of the SGW-U 50 for performing the Indirect data forwarding is set in the Relocation Response message received from the MME 20, the AMF 10 transmits an Nsmf_PDUSession_Context Request to the SMF+PGW-C 40, and provides an instruction to secure the resource (for example, the resource for the tunnel in which the user data are transferred) for performing the Indirect data forwarding. However, in a case of Home-routed roaming, the AMF 10 transmits the Nsmf_PDUSession_Context Request to the V-SMF 80 located in a visited public land mobile network (VPLMN). The V-SMF 80 that receives the Nsmf_PDUSession_Context Request transmits the Nsmf_PDUSession_Context Request to the SMF+PGW-C 40. Note that the Nsmf_PDUSession_Context Request may be referred to as an Nsmf_PDUSession_Context Request message. Note that the AMF 10 may transmit an Nsmf_PDUSession_UpdateSMContext Request instead of the Nsmf_PDUSession_Context Request to the SMF+PGW-C 40. Further, in a case of Home-routed roaming, the AMF 10 may transmit the Nsmf_PDUSession_UpdateSMContext Request instead of the Nsmf_PDUSession_Context Request to the V-SMF 80. The V-SMF 80 that receives the Nsmf_PDUSession_UpdateSMContext Request transmits the Nsmf_PDUSession_UpdateSMContext Request to the SMF+PGW-C 40. The Nsmf_PDUSession_UpdateSMContext Request may be referred to as an Nsmf_PDUSession_UpdateSMContext Request message.

Step (16): The SMF+PGW-C 40 that receives the Nsmf_PDUSession_Context Request instructs the UPF+PGW-U 30 to secure the resource (for example, the resource for the tunnel in which the user data are transferred) for performing the Indirect data forwarding. Further, the SMF+PGW-C 40 that receives the Nsmf_PDUSession_UpdateSMContext Request may instruct the UPF+PGW-U 30 to secure the resource (for example, the resource for the tunnel in which the user data are transferred) for performing the Indirect data forwarding. The UPF+PGW-U 30 that receives the instruction secures the resource for the Indirect data forwarding. For example, when the UPF+PGW-U 30 secures the resource for the Indirect data forwarding, the UPF+PGW-U 30 may notify the SMF+PGW-C 40 that the resource is secured.

Step (17): The SMF+PGW-C 40 transmits an Nsmf_PDUSession_Context Response to the AMF 10. In a case of Home-routed roaming, the SMF+PGW-C 40 transmits the Nsmf_PDUSession_Context Response to the V-SMF 80. The V-SMF 80 that receives the Nsmf_PDUSession_Context Response transmits the Nsmf_P-

DUSession_Context Response to the AMF 10. For example, when the SMF+PGW-C 40 receives, from the UPF+PGW-U 30, the notification indicating that the resource for the Indirect data forwarding is secured, the SMF+PGW-C 40 may transmit the Nsmf_PDUSession_Context Response to the AMF 10 or the V-SMF 80. Note that the SMF+PGW-C 40 may transmit an Nsmf_PDUSession_UpdateSMContext Response instead of the Nsmf_PDUSession_Context Response to the AMF 10. Further, in a case of Home-routed roaming, the SMF+PGW-C 40 may transmit the Nsmf_PDUSession_UpdateSMContext Response instead of the Nsmf_PDUSession_Context Response to the V-SMF 80. The V-SMF 80 that receives the Nsmf_PDUSession_UpdateSMContext Response transmits the Nsmf_PDUSession_UpdateSMContext Response to the AMF 10. The Nsmf_PDUSession_UpdateSMContext Response may be referred to as an Nsmf_PDUSession_UpdateSMContext Response message.

Step (18): The NG-RAN 5 decides cancel of the Handover procedure during activation for the UE 3. As an example of the decision, when the NG-RAN 5 can confirm that a signal of the UE 3 is strongly received in the NG-RAN 5, and the NG-RAN 5 determines that the NG-RAN 5 can continue the communication with the UE 3, and the like, the NG-RAN 5 decides the cancel of the Handover procedure during the activation for the UE 3.

The description above is the common procedure activated in the first aspect and the second aspect. In other words, step 18 in FIG. 17 is the same as step 1 in FIG. 18 and step 1 in FIG. 19.

(First Aspect)

The first aspect will be described.

Figure 18:
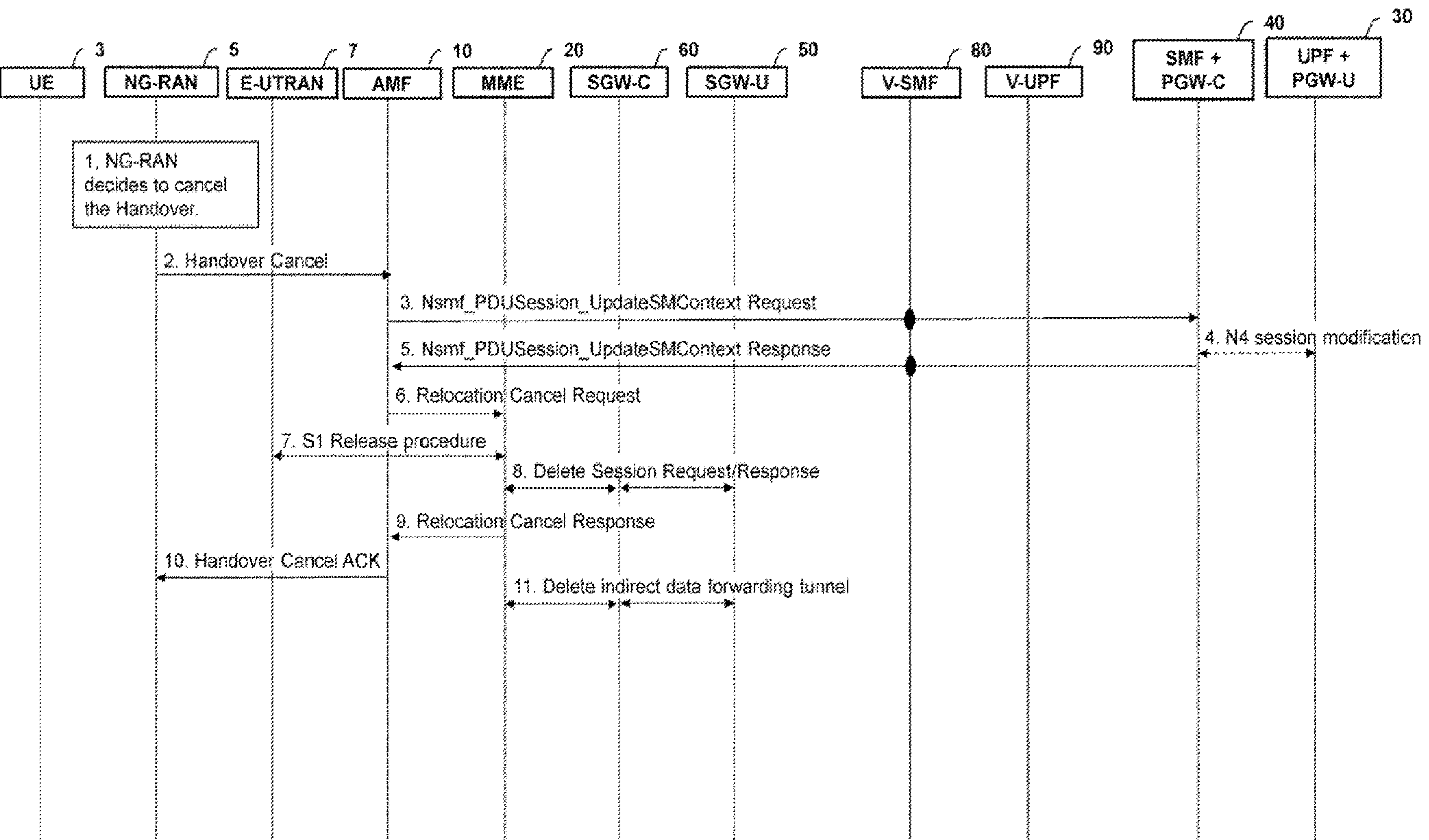
FIG. 18 is a diagram illustrating a procedure of Handover Cancel according to the first aspect.

An example of the Handover Cancel procedure for the Handover procedure from the 5GS to the EPS will be described by using FIG. 18. The first aspect discloses that release of a resource being secured in the UPF+PGW-U 30 is performed when the AMF 10 receives a Handover Cancel message from the NG-RAN 5. The Handover Cancel procedure is included in the Handover procedure.

An example of the Handover Cancel procedure included in FIG. 18 will be described in detail as follows.

Step (1): The NG-RAN 5 decides cancel of the Handover procedure during activation for the UE 3. For example, the NG-RAN 5 decides to perform the Handover Cancel procedure.

Step (2): The NG-RAN 5 transmits the Handover Cancel message to the AMF 10. For example, when the NG-RAN 5 decides the cancel of the Handover procedure during the activation for the UE 3, the NG-RAN 5 may transmit the Handover Cancel message to the AMF 10. The Handover Cancel message may be referred to as a message for canceling handover from the 5GS to the EPS.

Step (3): The AMF 10 that receives the Handover Cancel message from the NG-RAN 5 transmits an Nsmf_PDUSession_UpdateSMContext Request to the SMF+PGW-C 40, and notifies cancel of handover to the EPS. A Relocation Cancel Indication is set in the Nsmf_PDUSession_UpdateSMContext Request.

The Relocation Cancel Indication is an indication that notifies the SMF+PGW-C 40 that Handover is canceled and the UE 3 continues the communication by using the NG-RAN 5, and may be indication information for releasing a resource being secured for the Handover. However, in a case of Home-routed roaming, the AMF 10 transmits the Nsmf_PDUSession_UpdateSMContext Request to the V-SMF 80 located in a visited public land mobile network (VPLMN). The V-SMF 80 that receives the Nsmf_PDUSession_UpdateSMContext Request transmits the Nsmf_PDUSession_UpdateSMContext Request to the SMF+PGW-C 40. Note that the Nsmf_PDUSession_UpdateSMContext Request may be referred to as an Nsmf_PDUSession_UpdateSMContext Request message. The SMF+PGW-C 40 may delete or release a session resource being secured in the SMF+PGW-C 40 and the UPF+PGW-U 30 during a Handover Preparation procedure, based on the Relocation Cancel Indication.

Step (4): The SMF+PGW-C 40 that receives the Nsmf_PDUSession_UpdateSMContext Request instructs the UPF+PGW-U 30 to release the secured resource. The secured resource is the resource being secured by the UPF+PGW-U 30 in step (5) in FIG. 17 for the transmission using the EPS. Further, the secured resource may include the resource being secured by the UPF+PGW-U 30 in step (16) in FIG. 17 for the Indirect data forwarding. For example, the SMF+PGW-C 40 may instruct the UPF+PGW-U 30 to release the resource being secured for the transmission using the EPS and the resource being secured for the Indirect data forwarding. The UPF+PGW-U 30 that receives the instruction of the resource release releases the secured resource. The Nsmf_PDUSession_UpdateSMContext Request may be referred to as a message for the resource release. Further, for example, when the UPF+PGW-U 30 releases the resource, the UPF+PGW-U 30 may notify the SMF+PGW-C 40 that the resource is released.

Step (5): The SMF+PGW-C 40 transmits an Nsmf_PDUSession_UpdateSMContext Response to the AMF 10. In a case of Home-routed roaming, the SMF+PGW-C 40 transmits the Nsmf_PDUSession_UpdateSMContext Response to the V-SMF 80. The V-SMF 80 that receives the Nsmf_PDUSession_UpdateSMContext Response transmits the Nsmf_PDUSession_UpdateSMContext Response to the AMF 10. For example, when the SMF+PGW-C 40 receives the notification indicating that the resource being secured for the transmission using the EPS described above is released, the SMF+PGW-C 40 may transmit the Nsmf_PDUSession_UpdateSMContext Response to the AMF 10 or the V-SMF 80. Note that the Nsmf_PDUSession_UpdateSMContext Response may be referred to as an Nsmf_PDUSession_UpdateSMContext Response message.

Step (6): The AMF 10 transmits a Relocation Cancel Request message to the MME 20. For example, when the AMF 10 receives the Nsmf_PDUSession_UpdateSMContext Response, the AMF 10 may transmit the Relocation Cancel Request message to the MME 20. Note that the Relocation Cancel Request may be referred to as a message for releasing a resource of the E-UTRAN 7. Further, the Relocation Cancel Request may be referred to as a message for releasing a resource of the SGW-U 50. Further, the Relocation Cancel Request may be referred to as a message for releasing a resource of the EPS.

Step (7): The MME 20 performs an S1 Release procedure between the E-UTRAN 7 and the MME 20 in order to release a resource being secured in the E-UTRAN 7. For example, when the MME 20 receives the Relocation Cancel Request message, the MME 20 may perform the S1 Release procedure. The secured resource is the resource being secured by the E-UTRAN 7 in steps (11 and 12) in FIG. 17. The E-UTRAN 7 releases the secured resource in the S1 Release procedure. For example, when the E-UTRAN 7 releases the secured resource, the E-UTRAN 7 may notify the MME 20 that the resource is released.

Step (8): The MME 20 transmits a Delete Session Request message to the SGW-C 60. For example, when the MME 20 receives the Relocation Cancel Request message, the MME 20 may transmit the Delete Session Request message to the SGW-C 60. Further, for example, when the S1 Release procedure in step (7) is completed (for example, when the MME 20 receives, from the E-UTRAN 7, the notification indicating that the resource being secured by the E-UTRAN 7 in steps (11 and 12) in FIG. 17 is released), the MME 20 may transmit the Delete Session Request message to the SGW-C 60. The SGW-C 60 that receives the Delete Session Request message instructs the SGW-U 50 to release the resource being secured in the SGW-U 50. The secured resource is the resource being secured by the SGW-U 50 in steps (8 to 10) in FIG. 17. The SGW-U 50 that receives the instruction releases the resource being secured in the SGW-U 50. The SGW-C 60 transmits a Delete Session Response message to the MME 20. For example, when the SGW-C 60 receives the notification indicating that the resource is released, the SGW-C 60 may transmit the Delete Session Response message to the MME 20.

Step (9): The MME 20 transmits a Relocation Cancel Response message to the AMF 10. For example, when the MME 20 receives the Delete Session Response message, the MME 20 may transmit the Relocation Cancel Response message to the AMF 10.

Step (10): The AMF 10 transmits a Handover Cancel ACK message to the NG-RAN 5. For example, when the AMF 10 receives the Relocation Cancel Response message, the AMF 10 may transmit the Handover Cancel ACK message to the NG-RAN 5.

Step (11): When the resource for performing the Indirect data forwarding is secured, the MME 20 transmits a Delete Indirect Data Forwarding Tunnel Request message to the SGW-C 60. The SGW-C 60 that receives the Delete Indirect Data Forwarding Tunnel Request message instructs the SGW-U 50 to release the resource being secured for performing the Indirect data forwarding in the SGW-U 50. The SGW-U 50 that receives the instruction releases the resource for performing the Indirect data forwarding. For example, the SGW-U 50 may notify the SGW-C 60 that the resource for performing the Indirect data forwarding is released. The SGW-C 60 transmits the Delete Indirect Data Forwarding Tunnel Response message to the MME 20 after the resource for performing the Indirect data forwarding is released. For example, when the SGW-C 60 receives, from the SGW-U 50, the notification indicating that the resource for performing the Indirect data forwarding is released, the SGW-C 60 may transmit the Delete Indirect Data Forwarding Tunnel Response message to the MME 20.

The present disclosure is able to provide a method of appropriately managing a resource for user data control. Specifically, by performing the procedure described above, all resources being secured in the Handover procedure from the 5GS to the EPS can be released. For example, even when the Handover procedure from the 5GS to the EPS is canceled, all resources for user data control being set in the Handover procedure can be released. Further, for example, a resource being secured in the UPF+PGW-U 30 in the Handover procedure from the 5GS to the EPS can be released. Further, for example, a resource being secured for performing the Indirect data forwarding in the Handover procedure from the 5GS to the EPS can be released. Furthermore, for example, a resource securing procedure in the Handover procedure from the 5GS to the EPS, and a release procedure of the resource in the Handover Cancel procedure become clear, and the Handover procedure and the Handover Cancel procedure having high quality in consideration of a difference in the GTP-U header being used in the 5GS and the EPS can be provided.

(Second Aspect)

The second aspect will be described.

Figure 19:
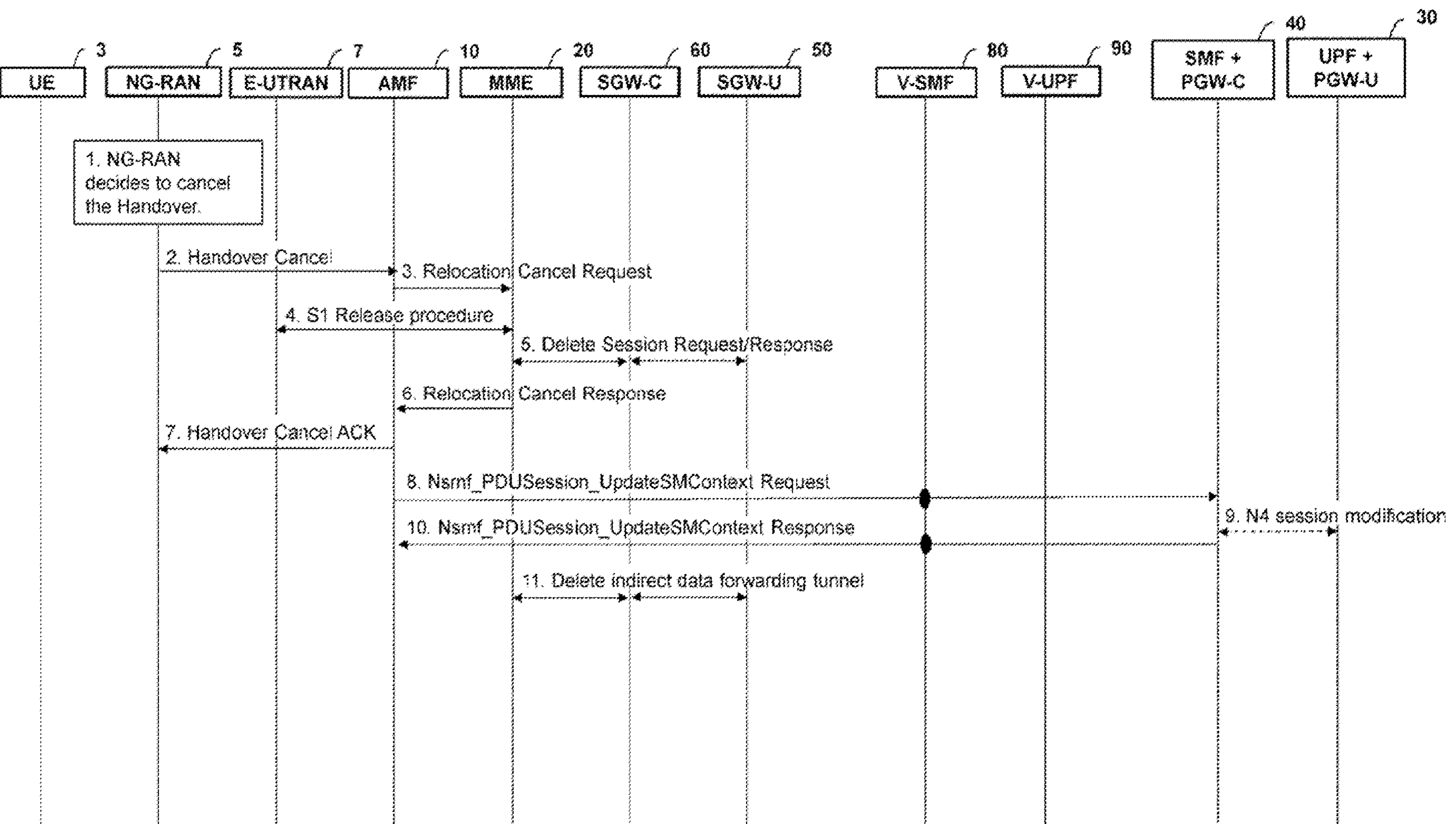
FIG. 19 is a diagram illustrating a procedure of Handover Cancel according to the second aspect.

An example of the Handover Cancel procedure for the Handover procedure from the 5GS to the EPS will be described by using FIG. 19. The second aspect discloses that release of a resource being secured in the UPF+PGW-U 30 is performed when the AMF 10 transmits a Handover Cancel ACK message to the NG-RAN 5.

An example of the Handover Cancel procedure included in FIG. 19 will be described in detail as follows.

Step (1): The NG-RAN 5 decides cancel of the Handover procedure during activation for the UE 3. For example, the NG-RAN 5 decides to perform the Handover Cancel procedure.

Step (2): The NG-RAN 5 transmits a Handover Cancel message to the AMF 10. For example, when the NG-RAN 5 decides the cancel of the Handover procedure during the activation for the UE 3, the NG-RAN 5 may transmit the Handover Cancel message to the AMF 10. The Handover Cancel message may be referred to as a message for canceling handover from the 5GS to the EPS.

Step (3): The AMF 10 transmits a Relocation Cancel Request message to the MME 20. For example, when the AMF 10 receives the Handover Cancel message, the AMF 10 may transmit the Relocation Cancel Request message to the MME 20.

Step (4): The MME 20 performs an S1 Release procedure between the MME 20 and the E-UTRAN 7 in order to release a resource being secured in the E-UTRAN 7. The secured resource is the resource being secured by the E-UTRAN 7 in steps (11 and 12) in FIG. 17. The E-UTRAN 7 releases the secured resource in the S1 Release procedure. For example, when the E-UTRAN 7 releases the secured resource, the E-UTRAN 7 may notify the MME 20 that the resource is released.

Step (5): The MME 20 transmits a Delete Session Request message to the SGW-C 60. The SGW-C 60 that receives the Delete Session Request message instructs the SGW-U 50 to release the resource being secured in the SGW-U 50. The secured resource is the resource being secured by the SGW-U 50 in steps (8 to 10) in FIG. 17. The SGW-U 50 that receives the instruction releases the resource being secured in the SGW-U 50. The SGW-C 60 transmits a Delete Session Response message to the MME 20. For example, when the SGW-C 60 receives the notification indicating that the resource is released, the SGW-C 60 may transmit the Delete Session Response message to the MME 20.

Step (6): The MME 20 transmits a Relocation Cancel Response message to the AMF 10. For example, when the MME 20 receives the Delete Session Response message, the MME 20 may transmit the Relocation Cancel Response message to the AMF 10.

Step (7): The AMF 10 transmits the Handover Cancel ACK message to the NG-RAN 5. For example, when the AMF 10 receives the Relocation Cancel Response message, the AMF 10 may transmit the Handover Cancel ACK message to the NG-RAN 5.

Step (8): The AMF 10 transmits an Nsmf_PDUSession_UpdateSMContext Request to the SMF+PGW-C 40, and notifies cancel of handover to the EPS. For example, when the AMF 10 transmits the Handover Cancel ACK message to the NG-RAN 5, the AMF 10 may transmit the Nsmf_PDUSession_UpdateSMContext Request to the SMF+PGW-C 40. Further, for example, when the AMF 10 receives the Relocation Cancel Response message from the MME 20, the AMF 10 may transmit the Nsmf_PDUSession_UpdateSMContext Request to the SMF+PGW-C 40. A Relocation Cancel Indication is set in the Nsmf_PDUSession_UpdateSMContext Request. However, in a case of Home-routed roaming, the AMF 10 transmits the Nsmf_PDUSession_UpdateSMContext Request to the V-SMF 80 located in a visited public land mobile network (VPLMN). Note that the Nsmf_PDUSession_UpdateSMContext Request may be referred to as an Nsmf_PDUSession_UpdateSMContext Request message. The V-SMF 80 that receives the Nsmf_PDUSession_UpdateSMContext Request transmits the Nsmf_PDUSession_UpdateSMContext Request to the SMF+PGW-C 40.

Step (9): The SMF+PGW-C 40 that receives the Nsmf_PDUSession_UpdateSMContext Request instructs the UPF+PGW-U 30 to release the secured resource. The secured resource is the resource being secured by the UPF+PGW-U 30 in step (5) in FIG. 17 for the transmission using the EPS. Further, the secured resource may include the resource being secured by the UPF+PGW-U 30 in step (16) in FIG. 17 for the Indirect data forwarding. For example, the SMF+PGW-C 40 may instruct the UPF+PGW-U 30 to release the resource being secured for the transmission using the EPS and the resource for the Indirect data forwarding. The UPF+PGW-U 30 that receives the instruction of the resource release releases the secured resource. The Nsmf_PDUSession_UpdateSMContext Request may be referred to as a message for the resource release. Further, for example, when the UPF+PGW-U 30 releases the resource, the UPF+PGW-U 30 may notify the SMF+PGW-C 40 that the resource is released.

Step (10): The SMF+PGW-C 40 transmits an Nsmf_PDUSession_UpdateSMContext Response to the AMF 10. In a case of Home-routed roaming, the SMF+PGW-C 40 transmits the Nsmf_PDUSession_UpdateSMContext Response to the V-SMF 80. The V-SMF 80 that receives the Nsmf_PDUSession_UpdateSMContext Response transmits the Nsmf_PDUSession_UpdateSMContext Response to the AMF 10. For example, when the SMF+PGW-C 40 receives the notification indicating that the resource being secured for the transmission using the EPS described above is released, the SMF+PGW-C 40 may transmit the Nsmf_PDUSession_UpdateSMContext Response to the AMF 10 or the V-SMF 80. Note that the Nsmf_PDUSession_UpdateSMContext Response may be referred to as an Nsmf_PDUSession_UpdateSMContext Response message.

Step (11): When the resource for performing the Indirect data forwarding is secured (for example, when an indirect forwarding tunnel is set during the Handover Preparation procedure), the MME 20 transmits a Delete Indirect Data Forwarding Tunnel Request message to the SGW-C 60. The SGW-C 60 that receives the Delete Indirect Data Forwarding Tunnel Request message instructs the SGW-U 50 to release the resource being secured for performing the Indirect data forwarding in the SGW-U 50 during the Handover Preparation procedure. The SGW-U 50 that receives the instruction releases the resource for performing the Indirect data forwarding. For example, the SGW-U 50 may notify the SGW-C 60 that the resource for performing the Indirect data forwarding is released. The SGW-C 60 transmits the Delete Indirect Data Forwarding Tunnel Response message to the MME 20 after the resource for performing the Indirect data forwarding is released. For example, when the SGW-C 60 receives, from the SGW-U 50, the notification indicating that the resource for performing the Indirect data forwarding is released, the SGW-C 60 may transmit the Delete Indirect Data Forwarding Tunnel Response message to the MME 20.

The present disclosure is able to provide a method of appropriately managing a resource for user data control. Specifically, by performing the procedure described above, all resources being secured in the Handover procedure from the 5GS to the EPS can be released. For example, even when cancel of the Handover procedure from the 5GS to the EPS is decided, all resources for user data control being set in the Handover procedure can be released. Further, for example, a resource being secured in the UPF+PGW-U 30 in the Handover procedure from the 5GS to the EPS can be released. Further, for example, a resource being secured for performing the Indirect data forwarding in the Handover procedure from the 5GS to the EPS can be released. Furthermore, for example, a resource securing procedure in the Handover procedure from the 5GS to the EPS, and a release procedure of the resource in the Handover Cancel procedure become clear, and the Handover procedure and the Handover Cancel procedure having high quality in consideration of a difference in the GTP-U header being used in the 5GS and the EPS can be provided.

Although the invention of the present application has been described with reference to the example embodiments, the invention of the present application is not limited to the above-described example embodiments. Various modifications that can be understood by those skilled in the art can be made to the configuration and the details of the invention of the present application within the scope of the invention.

This application is based upon and claims the benefit of priority from Japanese patent application No. 2021-022489, filed on Feb. 16, 2021, the disclosure of which is incorporated herein in its entirety by reference.

A part or the whole of the above-described example embodiments may also be described as in supplementary notes below, which is not limited thereto.

(Supplementary Note 1)

1. A method for a source core network node, comprising:

receiving, from a source Radio Access Network (RAN) associated with a 5G System (5GS), a first message for canceling handover of a terminal from the 5GS to an Evolved Packet System (EPS);

transmitting a second message to a target core network node associated with the EPS when receiving the first message;

receiving a third message from the target core network node when transmitting the second message;

transmitting a fourth message to the source RAN when receiving the third message; and transmitting a fifth message for releasing a resource being secured in a core network device when transmitting the fourth message.

(Supplementary Note 2)

The method according to Supplementary note 1, wherein the first message is a Handover Cancel message.

(Supplementary Note 3)

The method according to Supplementary note 1 or 2, wherein the second message is a Relocation Cancel Request message.

(Supplementary Note 4)

The method according to any one of Supplementary notes 1 to 3, wherein the third message is a Relocation Cancel Response message.

(Supplementary Note 5)

The method according to any one of Supplementary notes 1 to 4, wherein the fourth message is a Handover Cancel ACK message.

(Supplementary Note 6)

The method according to any one of Supplementary notes 1 to 5, wherein the fifth message is a Nsmf_PDUSession_UpdateSMContext Request message.

(Supplementary Note 7)

The method according to any one of Supplementary notes 1 to 6, wherein the source core network node is an Access and Mobility management Function (AMF) device.

(Supplementary Note 8)

The method according to any one of Supplementary notes 1 to 7, wherein the fifth message is transmitted to a Session Management Function (SMF) device.

(Supplementary Note 9)

The method according to any one of Supplementary notes 1 to 8, wherein the core network device is a User Plane Function (UPF) device.

(Supplementary Note 10)

A source core network node comprising:

reception means for receiving, from a source Radio Access Network (RAN) associated with a 5G System (5GS), a first message for canceling handover of a terminal from the 5GS to an Evolved Packet System (EPS); and transmission means for transmitting a second message to a target core network node associated with the EPS when receiving the first message, wherein the reception means is configured to receive a third message from the target core network node when transmitting the second message, the transmission means is configured to transmit a fourth message to the source RAN when receiving the third message, and the transmission means is configured to transmit a fifth message for releasing a resource being secured in a core network device when transmitting the fourth message.

(Supplementary Note 11)

The source core network node according to Supplementary note 10, wherein the first message is a Handover Cancel message.

(Supplementary Note 12)

The source core network node according to Supplementary note 10 or 11, wherein the second message is a Relocation Cancel Request message.

(Supplementary Note 13)

The source core network node according to any one of Supplementary notes 10 to 12, wherein the third message is a Relocation Cancel Response message.

(Supplementary Note 14)

The source core network node according to any one of Supplementary notes 10 to 13, wherein the fourth message is a Handover Cancel ACK message.

(Supplementary Note 15)

The source core network node according to any one of Supplementary notes 10 to 14, wherein the fifth message is a Nsmf_PDUSession_UpdateSMContext Request message.

(Supplementary Note 16)

The source core network node according to any one of Supplementary notes 10 to 15, wherein the source core network node is an Access and Mobility management Function (AMF) device.

(Supplementary Note 17)

The source core network node according to any one of Supplementary notes 10 to 16, wherein the fifth message is transmitted to a Session Management Function (SMF) device.

(Supplementary Note 18)

The source core network node according to any one of Supplementary notes 10 to 17, wherein the core network device is a User Plane Function (UPF) device.

(Supplementary Note 19)

A non-transitory computer-readable medium recording a program for causing a computer configured to control a source core network node to execute a method, the method including:

receiving, from a source Radio Access Network (RAN) associated with a 5G System (5GS), a first message for canceling handover of a terminal from the 5GS to an Evolved Packet System (EPS);

transmitting a second message to a target core network node associated with the EPS when receiving the first message;

receiving a third message from the target core network node when transmitting the second message;

transmitting a fourth message to the source RAN when receiving the third message; and transmitting a fifth message for releasing a resource being secured in a core network device when transmitting the fourth message.

REFERENCE SIGNS LIST

3 UE
5 NG-RAN
7 E-UTRAN
10 AMF
11 COMMUNICATION UNIT
12 CONTROL UNIT
20 MME
21, 31, 41, 51, 61, 81 COMMUNICATION UNIT
22, 32, 42, 52, 62, 82 CONTROL UNIT
30 UPF+PGW-U
40 SMF+PGW-C
50 SGW-U
60 SGW-C
70 DATA NETWORK
80 V-SMF
90 V-UPF

501, 1001, 2001, 3001, 4001, 6001, 8001 NETWORK INTERFACE

502, 1002, 2002, 3002, 4002, 6002, 8002 PROCESSOR

503, 1003, 2003, 3003, 4003, 6003, 8003 MEMORY

What is claimed is:

1. A method for a source core network node, comprising:

receiving, from a source Radio Access Network (RAN) associated with a 5G System (5GS), a first message for canceling handover of a terminal from the 5GS to an Evolved Packet System (EPS);

transmitting a second message to a target core network node associated with the EPS when receiving the first message;

receiving a third message from the target core network node when transmitting the second message;

transmitting a fourth message to the source RAN when receiving the third message; and transmitting a Nsmf_PDUSession_UpdateSMContext Request message for releasing a resource being secured in a core network device when transmitting the fourth message.

2. The method according to claim 1, wherein the first message is a Handover Cancel message.

3. The method according to claim 1, wherein the second message is a Relocation Cancel Request message.

4. The method according to claim 1, wherein the third message is a Relocation Cancel Response message.

5. The method according to claim 1, wherein the fourth message is a Handover Cancel ACK message.

6. The method according to claim 1, wherein the source core network node is an Access and Mobility management Function (AMF) device.

7. The method according to claim 1, wherein the Nsmf_PDUSession_UpdateSMContext Request message is transmitted to a Session Management Function (SMF) device.

8. The method according to claim 1, wherein the core network device is a User Plane Function (UPF) device.

9. A source core network node comprising:

at least one memory storing instructions, and at least one processor configured to execute the instructions to:

receive, from a source Radio Access Network (RAN) associated with a 5G System (5GS), a first message for canceling handover of a terminal from the 5GS to an Evolved Packet System (EPS);

transmit a second message to a target core network node associated with the EPS when receiving the first message;

receive a third message from the target core network node when transmitting the second message;

transmit a fourth message to the source RAN when receiving the third message; and transmit a Nsmf_PDUSession_UpdateSMContext Request message for releasing a resource being secured in a core network device when transmitting the fourth message.

10. The source core network node according to claim 9, wherein the first message is a Handover Cancel message.

11. The source core network node according to claim 9, wherein the second message is a Relocation Cancel Request message.

12. The source core network node according to claim 9, wherein the third message is a Relocation Cancel Response message.

13. The source core network node according to claim 9, wherein the fourth message is a Handover Cancel ACK message.

14. The source core network node according to claim 9, wherein the source core network node is an Access and Mobility management Function (AMF) device.

15. The source core network node according to claim 9, wherein the Nsmf_PDUSession_UpdateSMContext Request message is transmitted to a Session Management Function (SMF) device.

16. The source core network node according to claim 9, wherein the core network device is a User Plane Function (UPF) device.

17. A non-transitory computer-readable medium recording a program for causing a computer configured to control a source core network node to execute a method, the method including:

receiving, from a source Radio Access Network (RAN) associated with a 5G System (5GS), a first message for canceling handover of a terminal from the 5GS to an Evolved Packet System (EPS);

transmitting a second message to a target core network node associated with the EPS when receiving the first message;

receiving a third message from the target core network node when transmitting the second message;

transmitting a fourth message to the source RAN when receiving the third message; and transmitting a Nsmf_PDUSession_UpdateSMContext Request message for releasing a resource being secured in a core network device when transmitting the fourth message.

* * * * *